US011698627B2

(12) United States Patent
Freire et al.

(10) Patent No.: US 11,698,627 B2
(45) Date of Patent: Jul. 11, 2023

(54) VEHICLE BODY ASSEMBLY STATION

(71) Applicant: ABB SCHWEIZ AG, Baden (CH)

(72) Inventors: Jesús Freire, Vitoria (ES); Torbjorn Albertsson, Västerås (SE); Ramon Casanelles Moix, Sant Cugat del Vallès (ES)

(73) Assignee: ABB SCHWEIZ AG, Baden (CH)

( * ) Notice: Subject to any disclaimer, the term of this patent is extended or adjusted under 35 U.S.C. 154(b) by 462 days.

(21) Appl. No.: 16/959,405

(22) PCT Filed: Jan. 8, 2019

(86) PCT No.: PCT/EP2019/050280
§ 371 (c)(1),
(2) Date: Jun. 30, 2020

(87) PCT Pub. No.: WO2019/137884
PCT Pub. Date: Jul. 18, 2019

(65) Prior Publication Data
US 2020/0338739 A1    Oct. 29, 2020

(30) Foreign Application Priority Data

Jan. 9, 2018  (EP) .................................... 18382008

(51) Int. Cl.
| G05B 19/418 | (2006.01) |
| B25J 5/02 | (2006.01) |
| B25J 9/00 | (2006.01) |
| B25J 9/16 | (2006.01) |
| B62D 65/18 | (2006.01) |

(52) U.S. Cl.
CPC .......... G05B 19/41815 (2013.01); B25J 5/02 (2013.01); B25J 9/0093 (2013.01); B25J 9/1669 (2013.01);B25J 9/1687 (2013.01); B62D 65/18 (2013.01); G05B 19/4182 (2013.01); G05B 2219/45064 (2013.01); G05B 2219/50393 (2013.01)

(58) Field of Classification Search
CPC . B25J 9/0093; B25J 5/02; B25J 9/1669; B25J 9/1687; B62D 65/18;
(Continued)

(56) References Cited

U.S. PATENT DOCUMENTS

| 4,799,581 A | 1/1989 | Fujii | |
| 5,645,895 A * | 7/1997 | Murayama | .......... B05B 13/0452 |
| | | | 427/424 |

(Continued)

FOREIGN PATENT DOCUMENTS

| CN | 109591919 A * | 4/2019 | ............. B62D 65/14 |
| DE | 102009024621 A1 | 12/2010 | |

(Continued)

OTHER PUBLICATIONS

International Search Report and Written Opinion dated Apr. 10, 2019 for International Patent Application No. PCT/EP2019/050280, 12 pages.

*Primary Examiner* — Thomas Randazzo
(74) *Attorney, Agent, or Firm* — Squire Patton Boggs (US) LLP

(57) ABSTRACT

The vehicle body assembly station comprises main transport assembly for conveying a vehicle body along a first direction D1 in which at least one assembly robot is provided to move along a second direction D2, and temporary transport assembly whose operation is more accurate than that of the main transport assembly for moving the vehicle body independently from the main transport assembly while the assembly robot is performing operations on the vehicle body, whereby a new coordinate reference system is created by the temporary transport assembly.

14 Claims, 6 Drawing Sheets

(58) Field of Classification Search
CPC .......... G05B 19/41815; G05B 19/4182; G05B 2219/45064; G05B 2219/50393; G05B 2219/39102; G05B 2219/41457; Y02P 90/02

See application file for complete search history.

(56) References Cited

U.S. PATENT DOCUMENTS

| | | | | |
|---|---|---|---|---|
| 2007/0009656 | A1* | 1/2007 | Nagase | B05D 3/0209 |
| | | | | 427/372.2 |
| 2007/0042123 | A1* | 2/2007 | Endregaard | B05B 13/0452 |
| | | | | 118/313 |
| 2009/0158579 | A1 | 6/2009 | Climent et al. | |
| 2009/0248201 | A1* | 10/2009 | Habisreitinger | B23P 21/00 |
| | | | | 700/245 |
| 2010/0230511 | A1* | 9/2010 | Umezawa | B05B 16/95 |
| | | | | 239/303 |
| 2011/0099788 | A1 | 5/2011 | Kilibarda | |
| 2013/0158709 | A1* | 6/2013 | Shi | B25J 9/0084 |
| | | | | 901/47 |

FOREIGN PATENT DOCUMENTS

| | | | | |
|---|---|---|---|---|
| DE | 202011052222 U1 | | 3/2013 | |
| DE | 202011052222 U1 | * | 5/2013 | ............. B62D 65/18 |
| GB | 2168174 A | * | 6/1986 | ............. B25J 9/0093 |
| JP | H0557570 A | * | 3/1993 | ............. B23Q 39/02 |

* cited by examiner

VEHICLE BODY ASSEMBLY STATION

CROSS-REFERENCE TO RELATED APPLICATIONS

This application is a national-stage filing under 37 USC 371(c) of International No PCT/EP2019/050280, filed Jan. 8, 2019, which claims priority to, and the benefit of European Patent Application EP18382008.3, filed on Jan. 9, 2018, the entire contents of each of which are herein incorporated by reference in their entirety for all purposes.

FIELD OF THE INVENTION

The present disclosure relates to the assembly of vehicle bodies and parts thereof in automotive production lines where vehicle bodies are conveyed by transport assemblies through one or more assembly stations where assembly robots perform operations on the vehicle bodies.

A method for assembling a vehicle body through said assembly station or stations is also described herein.

BACKGROUND

In the automotive industry, automotive production lines usually include at least one assembly station for assembling vehicle bodies where assembly operators and robots operate to assemble parts such as seats, doors, windshield, wheels, steering mechanisms, etc. In many cases, vehicle bodies are advanced continuously by suitable transport assemblies in the assembly line.

The above-mentioned assembly robots are usually arranged to advance in corresponding assembling stations following the movement of the transport assembly in one or both sides of the assembly line as required, that is, on one or both sides of the transport assembly.

When a vehicle body that is advanced along the vehicle body assembling line by said transport assembly arrives at an assembling station, the assembly robot or robots is/are driven therealong taking into account the travel speed of the vehicle body in the conveyor. As the assembly robots move, their arms are properly driven to perform operations on the vehicle body.

One example of the above vehicle body assembly station is disclosed in US20060167587. The assembly station disclosed in this document includes at least one assembly robot arranged to assemble parts in the vehicle body. A digital encoder is provided on an axle of the conveyor drive and the assembly robot is controlled to track the movement of the conveyor, adopting a position that is effectively stationary with respect to the vehicle body. To correct errors due to the conveyor motion not being as smooth as the conveyor drive axle motion, an optical sensor is provided on the conveyor that compares the frequency and amplitude of relative movement over several cycles, and synchronises the robot assembly action to the peak of conveyor movement. A robot guiding sensor, such as a measurement laser, measures the displacement that is required for the end effector to reach the target on the vehicle body. In other embodiments, the vehicle body is stopped in front of the robot and the coordinates of a target point are determined using a measurement laser.

In spite of the use of sensing devices, it has been found that inaccuracies occur during assembling operations, which are very difficult to avoid. Such inaccuracies are mainly caused by many factors such as for example variable seating of the vehicle body on a carrier or conveyor, etc. and also caused by the travel movement of the vehicle body causing undesirable lateral movements, lack of stability in the direction of the main movement, vibrations, rattling, etc.

A further disadvantage in current vehicle body assembling stations is that the assembly robots are not often accurately driven synchronously with the travel speed of the vehicle body in the conveyor such that further inaccuracies arise which adversely affect efficiency of assembling operations in the assembly line.

In view of the above, the present disclosure has an object of providing a vehicle body assembly station which at least partially overcome the above disadvantages.

The present disclosure has also an object of providing a method for assembling a vehicle body through said assembly station.

SUMMARY

A vehicle body assembly station where vehicle bodies are advanced continuously by a transport assembly is disclosed herein with which the above disadvantages are addressed and with which further advantages are obtained, as it will be described below.

The present vehicle body assembly station is intended to assemble parts of a vehicle body such as, for example, seats, doors, windshield, wheels, steering mechanisms, etc. in a vehicle manufacturing line. The assembly station disclosed herein comprises a main transport assembly for conveying a vehicle body, or a number of vehicles bodies, along a first direction. Such first direction means a longitudinal direction passing through one or more of the present vehicle body assembly stations.

As used herein, the term "station" refers to a zone in a vehicle assembly line at which one part of a vehicle assembly operation is performed. Also within the meaning of the present disclosure, a line comprises a series of stations with machines, equipment, workers, etc., in a factory for assembling a motor vehicle by passing parts thereof, such as for example a vehicle body, from one station to the next one. Parts and materials are supplied to such stations.

Also within the meaning of the present disclosure, the term "mounted", refers to directly or indirectly engaged, joined, attached, coupled, fitted or otherwise installed to another structure either directly or through intermediate parts, and in some cases capable of maintaining freedom to move therealong.

In the present disclosure, the expression "operate in synchronism with" means that one mechanism operates while the vehicle body is advanced by a temporary transport assembly and under a new coordinate reference system under which operations on a vehicle body are performed. Said new coordinate reference system is created or defined by said temporary transport assembly which will be described below.

Within the meaning of the present disclosure, the term "robot track" refers to any type of base, rail or suitable structure over which one or more devices or units can be advanced linearly. A robot track may also be configured as a conveyor belt structure.

The main transport assembly may be a conveyor, such as for example, a conveyor belt, a slat conveyor, a traction chain, a skid conveyor, a hanging overhead conveyor, lifting chain hangers, and the like. Other types of main transport assembly for conveying a vehicle body are also possible such as for example automated guided vehicles (AGVs) that can be moved on the ground, such as for example over an irregular floor in an automotive production line, along a path following e.g. markers on the floor or other suitable signals.

The vehicle body assembly station disclosed herein includes at least one assembly robot. The assembly robot may be any robot suitable for performing assembly operations on a vehicle body. The assembly robot or robots in the present assembly station is/are arranged such that at least one part thereof, such as, for example, a robot arm, the entire robot structure, etc., can be moved along a second direction. The second direction along which the assembly robot moves in operation may preferably be at least substantially parallel to the first direction along which the vehicle body is advanced in operation. The above first and second directions as used herein relate to straight sections in correspondence with the passage of the vehicle body through the assembly line.

As stated above, a temporary transport assembly is provided for moving a vehicle body independently from the main transport assembly while one or more assembly robots perform(s) operations on the vehicle body. The operation of the temporary transport assembly is more accurate than that of the main transport assembly.

Within the meaning of the present disclosure, a "more accurate operation" of the temporary transport assembly involves a finer motion and higher accuracy in conveying a vehicle body, with reduced or no vibrations, as compared to standard main transport assembly used in known vehicle body assembly stations for transporting or conveying vehicle bodies through different assembly stations in an automotive production line where assembly robots perform operations thereon.

The temporary transport assembly comprises at least one moving device that may be displaceably mounted on corresponding robot tracks. At least one of the above mentioned assembly robots may be mounted on said corresponding robot tracks to move along said second direction. When moving devices are provided on robot tracks at both sides of the main transport assembly, at least some of the moving devices may be configured to temporary operate in synchronism with each other, that is, the moving devices in one side of the main transport assembly may be configured to temporary operate in synchronism with respect of those in the other side of the main transport assembly.

The moving devices are arranged to move a vehicle body independently from the main transport assembly while the assembly robot is performing operations on the vehicle body. The temporary transport assembly thus creates or define the above mentioned new coordinate reference system under which the at least one assembly robot can perform operations on the vehicle body.

In a first example, the main transport assembly comprises an automated guided vehicle (AGV) adapted to move on the ground, such as for example over an irregular floor in an automotive production line. The AGV is configured for conveying a vehicle body along said first direction following e.g. markers on the floor or other suitable signals. In said first example, the temporary transport assembly further includes at least one robot track. Examples of devices or units that can be advanced along robot tracks may be assembly robots and lifting mechanisms, which will be described in detail below. At least one of the assembly robots may be mounted on the robot track such that it is allowed to move relative to the robot track along the second direction substantially as if the vehicle body would not have been disconnected from the main transport assembly.

Also in said example, the temporary transport assembly includes a carrying platform that is displaceably supported by said moving device on the robot track.

The carrying platform is suitable to displace a vehicle body placed thereon along the second direction, independently from the main transport assembly. The carrying platform is positioned above an AGV travel path.

In a first example, the carrying platform may be supported directly or indirectly at two opposite sides thereof by corresponding moving devices on robot tracks along which the carrying platform can be displaced along the second direction. At least one assembly robot may be arranged to move on the robot tracks along said second direction. The at least one assembly robots and the carrying platform may be displaced independently of one another and relative to the robot track or tracks for example while performing operations on a vehicle body that is placed on the carrying platform. In one variant, at least one assembly robot may be arranged fixed to the carrying platform. Still in a further variant, the carrying platform may be arranged fixed to the robot track or tracks while the assembly robots are allowed to move therealong.

At least one ramp may be provided for accessing the carrying platform. The at least one ramp may be associated, e.g. attached to, with at least one edge of the carrying platform. In one practical example, an access ramp and an exit ramp is attached to opposite edges of the carrying platform in a way that that a vehicle body, together with the AGV, is allowed to climb up and down of the carrying platform.

The movement of the carrying platform on the robot tracks provides fine motion and thus very high accuracy in conveying a vehicle body, with reduced or no vibrations, allowing the assembly robots to work efficiently. This is very advantageous for example when mounting windows on a vehicle.

In the first example, when assembly operations on the vehicle body have been completed, the vehicle body together with the AGV may be returned on the ground.

In a second example, the main transport assembly comprises a conveyor so that no AGV and no carrying platform are used.

In a first variant of said second example, a device for temporarily disconnecting the vehicle body from the main transport assembly may include at least one moving device capable of lifting the vehicle body a given height relative to the main transport assembly so as to disconnect it therefrom. The moving device is also configured to move the vehicle body along the second direction.

In a second variant of said second example, the device for temporarily disconnecting the vehicle body from the main transport assembly may include at least one lifting robot. Said at least one lifting robot is suitably configured for temporarily disconnecting the vehicle body from the main transport assembly by lifting the vehicle body a given height relative to the main transport assembly. The lifting robot may be also configured to move the vehicle body along the second direction. The lifting robot(s) may be mounted on corresponding robot track or tracks or arranged on the ground.

In both cases, the vehicle body and other elements that are not part of the vehicle body can be lifted together where necessary.

Once the vehicle body has been temporarily disconnected from the main transport assembly by said temporarily disconnecting device, whether they comprise lifting robot(s) or moving device(s), that is, once the vehicle body has been properly separated, e.g. raised a given height, from the main transport assembly such that the former is not advanced by the latter, the assembly robot or robots can start performing operations on the vehicle body as it moves therewith.

The at least one assembly robot is thus capable of working on the vehicle body either autonomously or running along corresponding robot tracks as stated above, with the vehicle body isolated or disconnected from the main transport assembly and connected to the temporary transport assembly. A pseudo-static system is thus defined.

In this second example, when assembly operations on the vehicle body have been completed, the vehicle body may be returned on the main transport assembly.

A method is also provided for assembling a vehicle body with the above described station. The present method comprises conveying a vehicle body by a main transport assembly through at least one assembly station in which at least one assembly robot is provided. At some point, the vehicle body is moved by a temporary transport assembly whose operation is more accurate than that of the main transport assembly, independently from the main transport assembly. Then, at least one assembly robot can then perform assembling operations on the vehicle body under a new coordinate reference system that is defined or created by the temporary transport assembly.

In this method, the main transport assembly may comprise an AGV configured for conveying a vehicle body along the first direction. The AGV carrying a vehicle body thereon is driven to climb up the ramp towards the carrying platform. When the AGV and the vehicle are placed on the carrying platform, the AGV is stopped and assembly operations can be then started by assembly robots under the above mentioned new coordinate system created by the temporary transport assembly. In this case, when assembly operations have been completed, the AGV, together with the vehicle body thereon, may be driven again climbing down the ramp for leaving the carrying platform. The assembly robots and in some cases also the carrying platform are then positioned to be ready to perform assembly operations again on another vehicle body.

Reference is made to the case where main transport assembly are provided including a conveyor as well as mechanism for temporarily disconnecting the vehicle body from the main transport assembly, with no AGV and no carrying platform. In this specific case, once the vehicle body has been temporarily disconnected from the main transport assembly the assembly robot or robots may thus operate on the vehicle body either moving autonomously, e.g. on the ground, along the above mentioned second direction, or mounted on corresponding robot track or tracks to advance along said second direction. In this case, once assembly operations on the vehicle body have been completed, the vehicle body may be returned on the main transport assembly, at a position in the main transport assembly corresponding to that as if the vehicle body would not have been disconnected from the main transport assembly.

Finally, the temporary disconnecting device is driven back by the temporary transport assembly and another vehicle body arrives at the assembly station, where it is lifted from the main transport assembly by the above mentioned temporary disconnecting device and advanced by said temporary transport assembly while assembly robots perform operations thereon.

In other different cases, at least one lifting robot may be provided configured to act as a device for temporarily disconnecting the vehicle body from the main transport assembly. The lifting robot or robots may be adapted for lifting the vehicle body relative to the main transport assembly and for moving the vehicle body under a new coordinate reference system created or defined by the temporary transport assembly and under which operations on a vehicle body are performed. After completion of the operations the vehicle body may be returned on the main transport assembly at a position corresponding to that as if the vehicle body would not have been disconnected from the main transport assembly.

The lifting robot or robots may be mounted on the robot track or tracks. In some examples, the lifting robot or robots may work from said robot tracks or any other external driving mechanism, with or without the use of tracks. For example, the lifting robot or robots could be arranged to move on the ground. Other alternative devices for temporarily disconnecting the vehicle body from the main transport assembly are also possible.

An extremely stable environment is created to facilitate assembly operations of vehicle bodies since they are performed with the vehicle body disconnected from the main transport assembly.

The fact that assembly operations are performed on the vehicle body as it is conveyed by the temporary transport assembly results in that said operations are performed in a more accurate way than when the vehicle body is advanced by the main transport assembly, e.g., mounted on a conveyor. This is because with the temporary transport assembly, transportation of a vehicle body is carried out with very high accuracy with which inaccuracies produced when vehicle bodies are transported using the main transport assembly, as occurs with prior art assembly stations, are at least greatly reduced.

In some examples, the present assembly station may include first and second assembly sub-stations. However, the provision of one assembly station is a preferred embodiment of the present assembly station. Said one assembly station may be arranged at one side of the main transport assembly or said one assembly station may be splitted into several sub-stations arranged at both sides of the main transport assembly. Still a further option is the provision of two or more different assembly stations arranged on both sides of the main transport assembly.

Lifting of the vehicle body relative to the main transport assembly may be carried out by lifting the vehicle body alone or even together with other elements that are not part of the vehicle body. For example, when the main transport assembly includes skid conveyors, the vehicle body can be lifted by the lifting mechanism together with the skid that has been detached from the conveyor.

It may be appropriate that the temporary disconnecting device include a mechanism for releasably locking the vehicle body to the temporary transport assembly, i.e, to at least one moving device or lifting robot. When robot tracks are provided, the temporary disconnecting device could include a mechanism for releasably locking the vehicle body to temporary transport assembly.

In the above example where first and second assembly sub-stations are provided, at least one of the assembly sub-stations may comprise at least one of said assembly robots for performing assembly operations on the vehicle body. In case the temporary transport assembly comprises moving devices arranged on robot tracks, the assembly sub-stations in the above example may comprise a corresponding first and second robot tracks that may be configured to temporary operate in synchronism with each other.

When robot tracks are provided, the assembly robots can advance moving over them. In this case, it may be preferred that the at least one moving device or lifting robot operate independently from the assembly robots, that is, in a way that they are not synchronized with each other. As stated above, the assembly robots move relative to the above described new coordinate system.

It is to be noted that one important feature of the present disclosure is that whatever temporary transport assembly is used, their operation is more accurate than that of the main transport assembly so that in a station with temporary transport assembly vehicle bodies are conveyed with higher accuracy as compared to the main transport assembly, with reduced or no vibrations.

Additional objects, advantages and features of examples of the present vehicle body assembly station and the present method for assembling a vehicle body will become apparent to those skilled in the art upon examination of the description, or may be learned by practice thereof.

BRIEF DESCRIPTION OF THE DRAWINGS

Particular embodiments of the present vehicle body assembly station will be described in the following by way of non-limiting examples, with reference to the appended drawings, in which.

DETAILED DESCRIPTION OF EXAMPLES

In the non-limiting examples of the present vehicle body assembly station 100 shown in the figures of the drawings, a vehicle body 110 is advanced continuously in a vehicle manufacturing line. This is carried out by a main transport assembly 120.

Assembly robots 210 are arranged at both sides of the vehicle body 110 as shown in FIGS. 1-5 of the drawings for performing assembling operations thereon, such as for example mounting seats, doors, windshield, wheels, steering mechanisms, etc., in the vehicle body 110.

Figure 1:
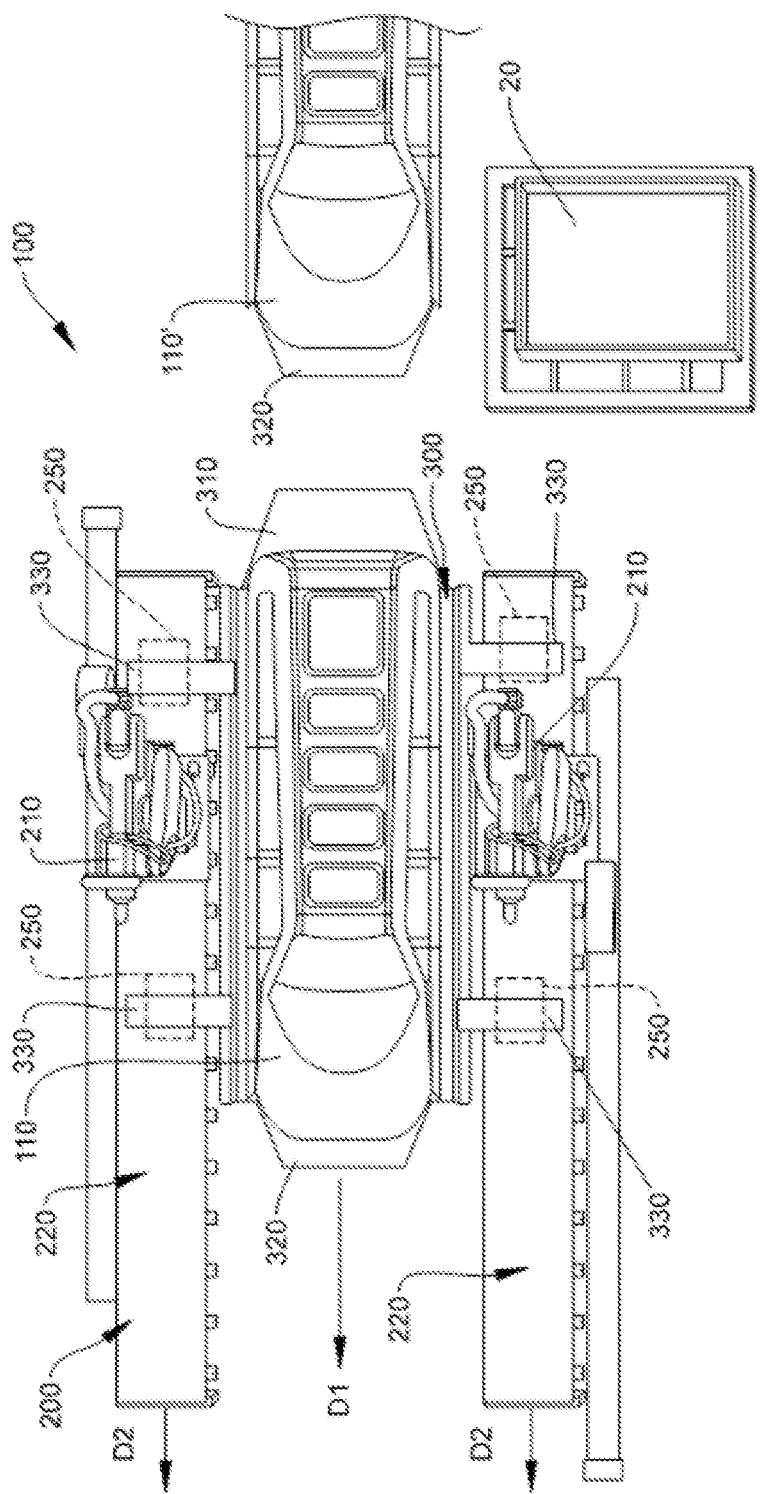
FIG. 1 is a top plan view of a first example of the present vehicle body assembly station showing where an AGV is used.
Figure 2:
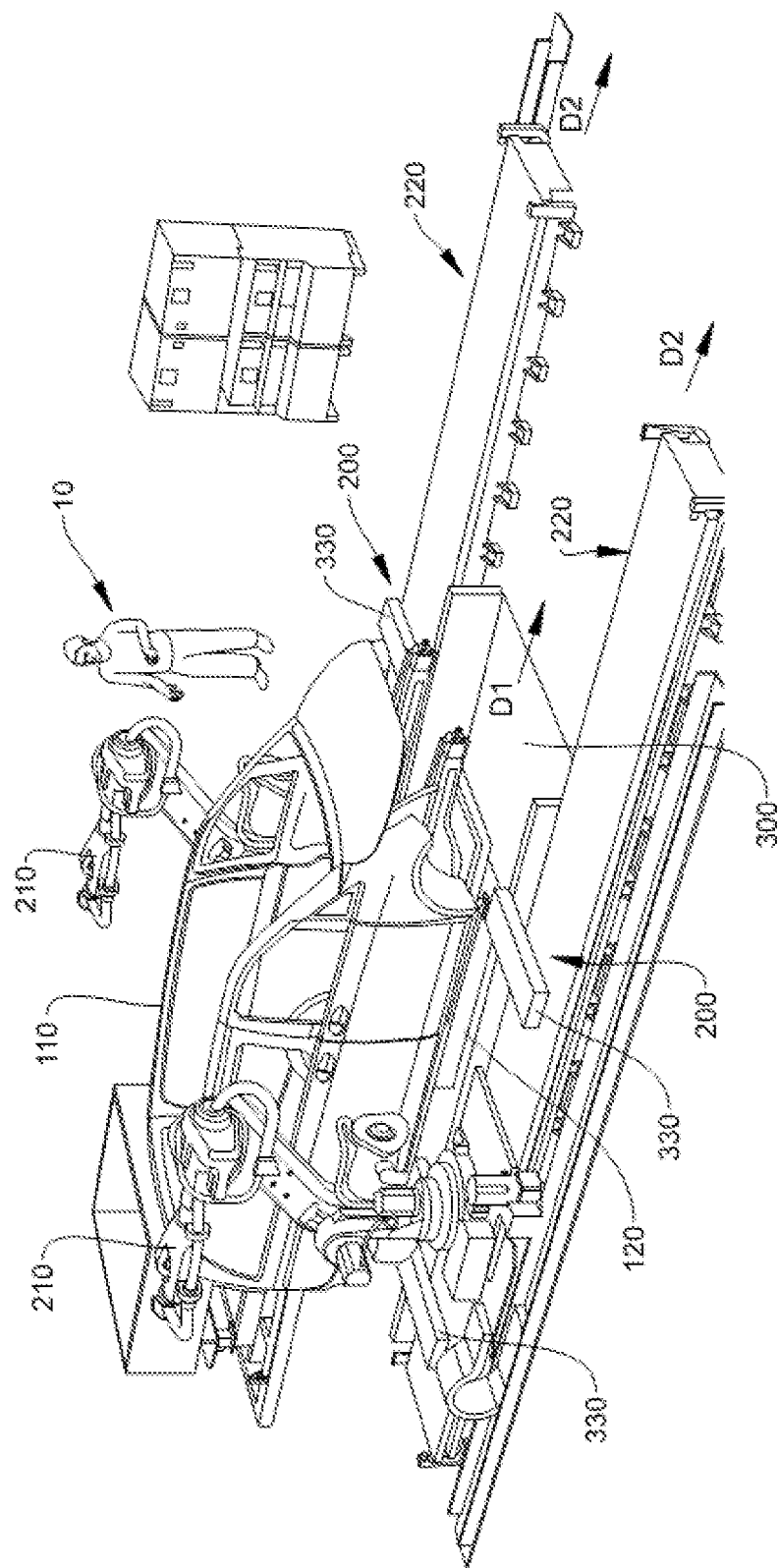
FIG. 2 is a general perspective view of the example in FIG. 1.
Figure 3:
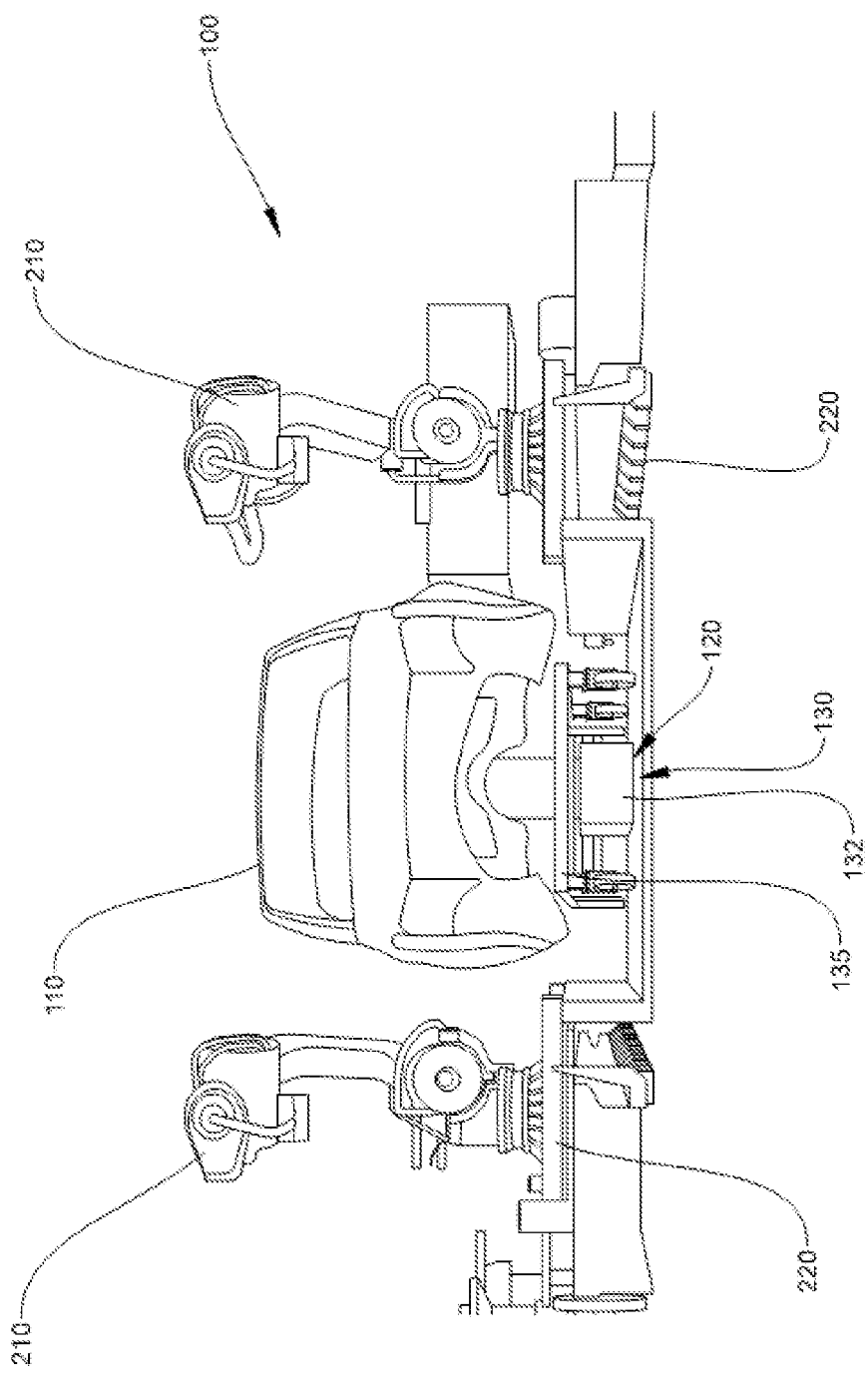
FIG. 3 is a front elevational view of the first example of the vehicle body assembly station where an AGV is used.
Figure 4:
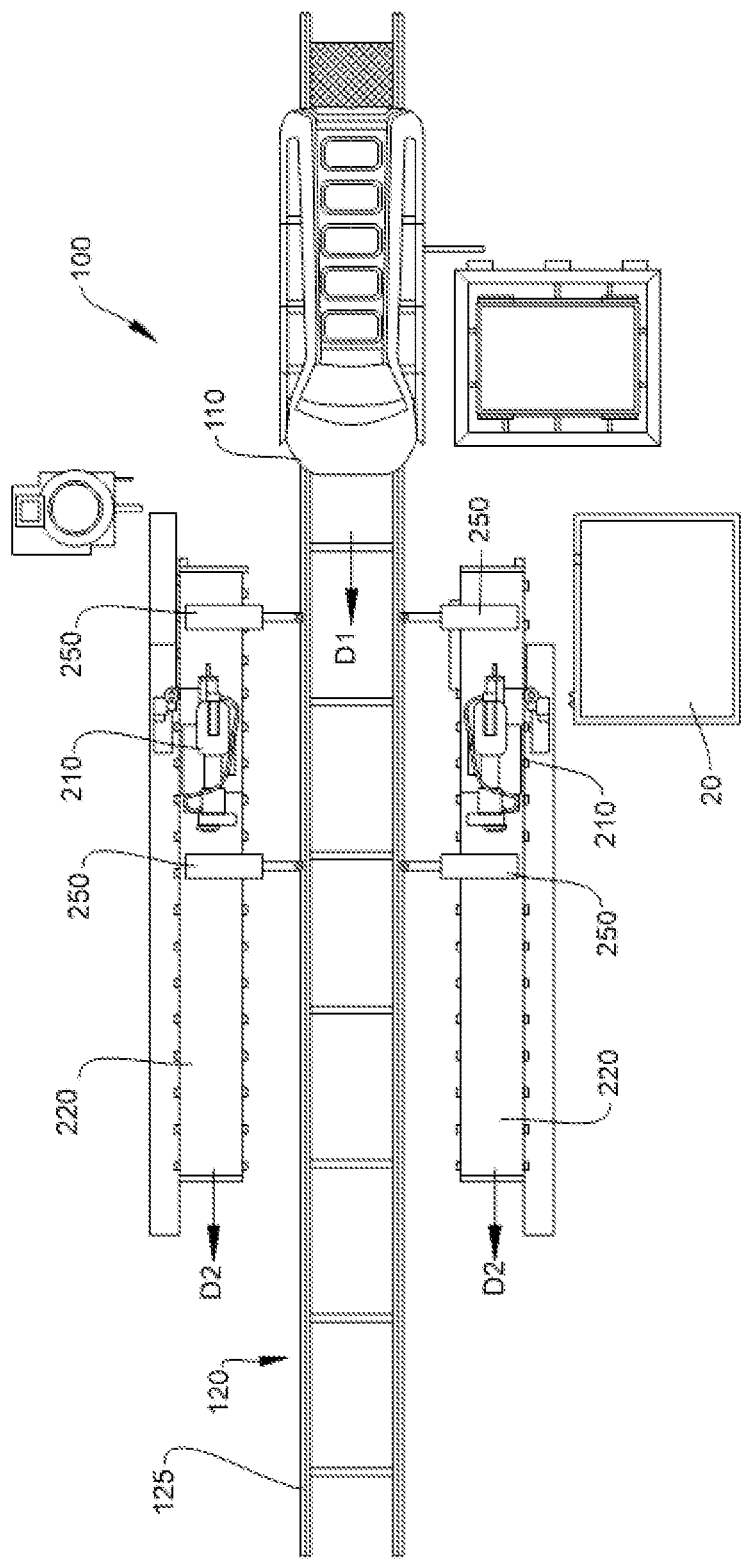
FIG. 4 is a general top plan view showing a vehicle body assembly line layout where a second example of a vehicle body assembly station is provided.
Figure 5:
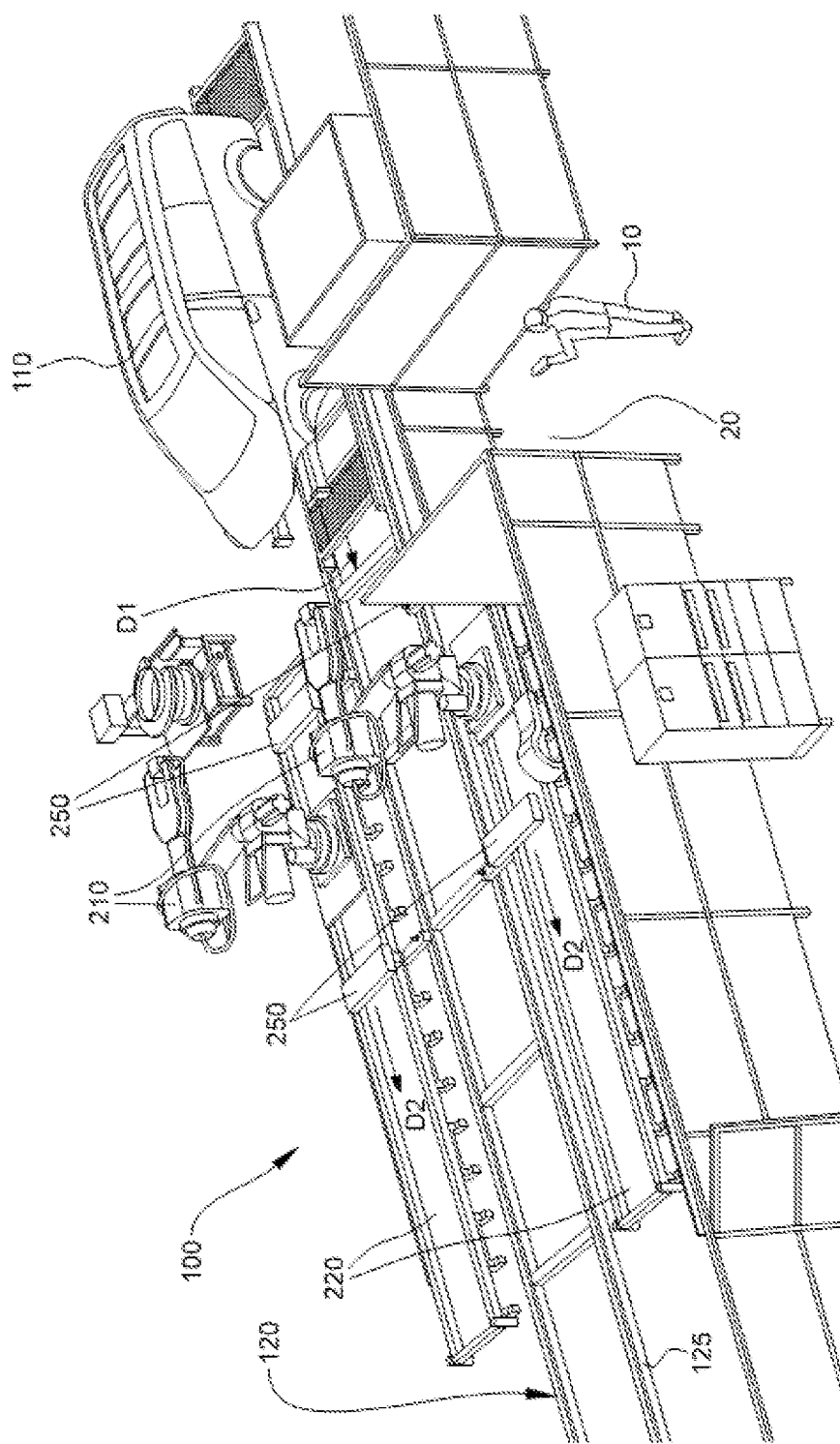
FIG. 5 is a general perspective view of the example in FIG. 3 showing a portion of a vehicle body assembly line where a vehicle body is shown entering a vehicle body assembly station.
Figure 6:
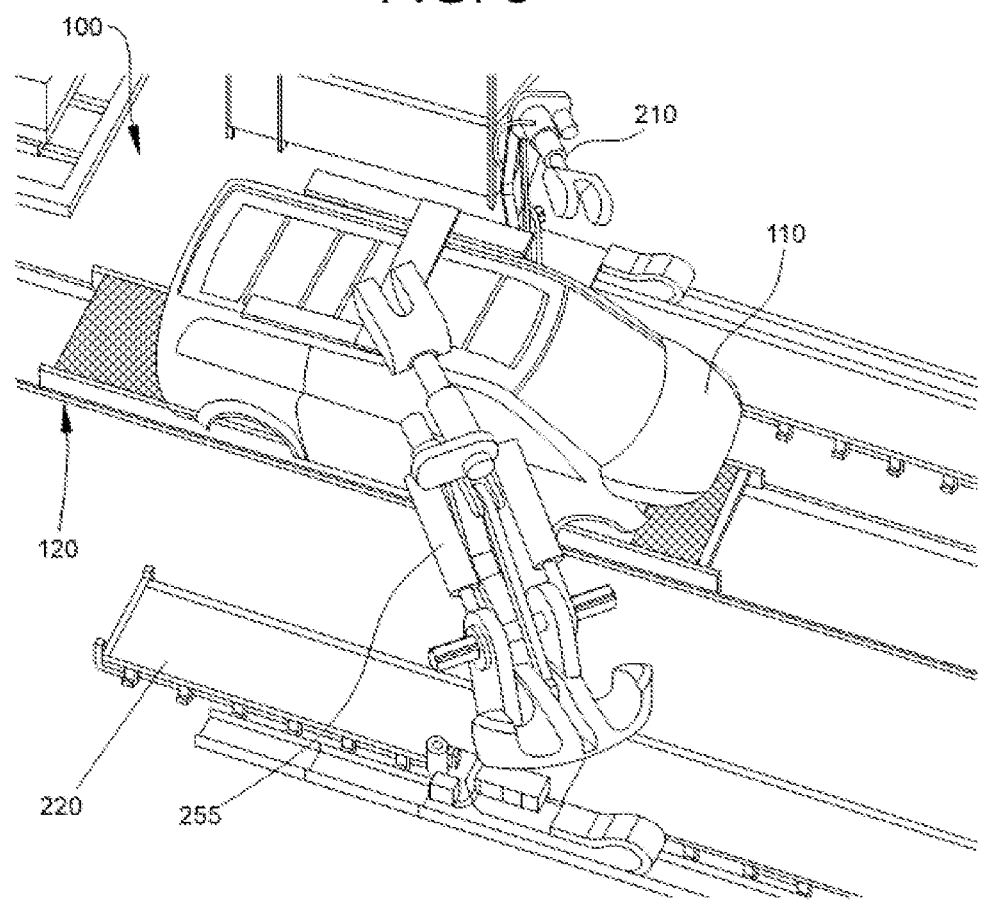
FIG. 6 is a general perspective view of one example where a lifting robot is provided for temporarily disconnecting a vehicle body from the main transport assembly.

In the non-limiting examples shown in the figures, the assembly robots 210 are mounted on robot tracks 220 arranged at both sides of the main transport assembly 120, that is, an automated guided vehicle (AGV) 130 in the example of FIGS. 1-3 or a conveyor 125 in the example of FIGS. 4-6. The robot tracks 220 are part of a temporary transport assembly 200, together with moving devices 250 that are displaceably mounted on the robot tracks 220 as shown in FIGS. 4 and 5 of the drawings. The temporary transport assembly 200 operates in a more accurate way than the main transport assembly 120 for moving a vehicle body 110. Thus, the use of a temporary transport assembly 200 for transporting a vehicle body 110 on which assembly robots 210 are arranged results in that assembly operations are carried out with very high accuracy. In said FIGS. 4 and 5, the moving devices 250 on the robot tracks 220 and the assembly robots 210 are configured to move along a second direction D2 in the assembly station 100. As shown in the drawings, the second direction D2 is at least substantially parallel to the first direction D1. The assembly robots 210 shown in the drawings are directly mounted on respective robot tracks 220. The moving devices 250, the robot tracks 220 and the assembly robots 210 can be accessed by operators 10 through a suitable access 20 in the station 100 with the relevant security measures.

In the assembly station 100, the assembly robots 210 are capable of working on the vehicle body 110 while they all move together as it will be described further below.

In a first example shown in FIGS. 1-3 of the drawings, an automated guided vehicle (AGV) 130 is provided. The AGV 130 in this case constitutes the main transport assembly 120. The AGV 130 in the example shown in FIGS. 1 and 2 of the drawings is arranged below a vehicle body 110' that is waiting for the assembly robots 210 to perform operations on it. As shown in FIG. 3, the AGV 130 comprises a driving unit 132 provided with wheels and a carriage 135 that is adapted to support a vehicle body 110 thereon. The AGV carriage 135 is attached to the AGV driving unit 132 through a stem (not shown) with a freedom of movement in a vertical direction. Other AVGs 130 may be alternatively used comprising a single unit construction.

The AGV 130 is configured for conveying a vehicle body 110 on the ground, such as for example over an irregular floor in an automotive production line, along the first direction D1 following elements such as markers or wires in the floor, magnets, or light for carrying a vehicle body 110 and displacing it along said first direction D1. In this example, a carrying platform 300 that is part of the temporary transport assembly 200 is arranged above an AGV travel path, defined by the first direction D1. Corresponding access and exit ramps 310, 320 are attached to opposite edges of the carrying platform 300, as shown in FIG. 2. The carrying platform 300 can be thus accessed by the AGV 130 carrying a vehicle body 110 thereon.

The carrying platform 300 in the example shown in FIGS. 1 and 2 is arranged to be displaceably supported by moving devices 250 on corresponding opposite robot tracks 220 through supporting portions 330 of the carrying platform 300 extending crosswise therefrom. A vehicle body 110 carried by the carrying platform 300 can be thus displaced with a finer motion, higher accuracy and with reduced or no vibrations, as compared to the main transport assembly 120.

Assembly robots 210 are arranged to move on the robot tracks 220 along the second direction D2. Therefore, the assembly robots 210 and the carrying platform 300 may be displaced along the second direction D2 relative to the robot track 220 under a new coordinate system. Said new coordinate system under which the assembly robot 210 perform their operations on a vehicle body 110 is created or defined by the temporary transport assembly 200.

In the example shown in FIGS. 1 and 2, the AGV 130 can be driven to be displaced while carrying a vehicle body 110 thereon. In operation, when AGV 130 with the vehicle body 110 carried thereon coming from different stations in an automotive production line through the conveyor 125 arrives at the assembly station 100 it reaches the access ramp 310 and then climbs it up so that it becomes suitably placed on the carrying platform 300. The AGV 130 with the vehicle body 110 thereon then stops. At that time, assembly operations may be started under the new coordinate system by the assembly robots 210 while the carrying platform 300 is moved by the moving device 250 along the robot tracks 220. When assembly operations have been completed, the carrying platform 300 with the vehicle body 110 and the AGV 130 carried thereon, are stopped and the AGV 130 is driven again for climbing the exit ramp 320 down and leaving the carrying platform 300. The assembly robots 210 and the carrying platform 300 are then positioned to be ready to perform again assembly operations on the next vehicle body 110'.

In a second example shown in FIGS. 4 and 5, operations by the assembly robots 210 on the vehicle body 110 are performed on the vehicle body 110 once the vehicle body 110 has been disconnected from the main transport assembly 120.

In this case, the main transport assembly 120 comprises a conveyor 125 and the moving device 250, that is part of the temporary transport assembly 200, as stated above, in this case is configured not only to move along corresponding robot tracks 220 but also for temporarily lifting the vehicle body 110 in order to disconnect it from the conveyor 125. As with the first example, assembly robots 210 are mounted on corresponding robot tracks 220 of the assembly station 100 arranged at both sides of the vehicle body 110.

The vehicle body 110 can be thus displaced by the moving devices 250 independently from the main transport assembly 120, i.e. isolated therefrom, such that the assembly robots 210 can perform operations thereon with greater accuracy than when carried by the main transport assembly 120. Said operations are performed on the vehicle body 110 while driven at a speed corresponding to that as if the vehicle body 110 would not have been disconnected from the main transport assembly 120.

The moving device 250 has been schematically illustrated in FIGS. 4 and 5 of the drawings. The moving device 250 is in this case configured for lifting a vehicle body 110 relative to the conveyor 125 as described above so as to disconnect it therefrom. Four moving devices 250 are in this case mounted on the robot tracks 220, two on each robot tracks 220.

In one alternative example shown in FIG. 6, a lifting robot 255 that may act as temporary transport assembly 200 is provided at one side of the vehicle body 110 for lifting a vehicle body 110 relative to the main transport assembly 120. One assembly robot 210 is provided at the other side of the vehicle body 110. Although the lifting robot 255 is shown mounted on the robot tracks 220, the lifting robot 255 could be autonomously driven, independently from the robot tracks 220. For example, the lifting robot 255 could be arranged to move on the ground.

In operation, a vehicle body 110 coming from different stations in an automotive production line through the conveyor 125 arrives at the assembly station 100. When the vehicle body 110 arrives at the assembly station 100, the vehicle body 110 is temporary disconnected from the conveyor 125 by the moving devices 250 or by the lifting robot 255, depending on the example. This is carried out at the same time the vehicle body 110 is advanced along the second direction D2, parallel to the first direction D1 associated with the conveyor 125.

Temporary disconnecting the vehicle body 110 from the conveyor 125 in this case involves raising the vehicle body 110 a given height from the conveyor 125 which is carried out by the moving devices 250 or the lifting robot 255, as described above. Then, the vehicle body 110 is positioned such that the assembly robots 210 are capable to properly work thereon. Operations by the assembly robots 210 are then performed while the vehicle body 110 is separated from the conveyor 125 at the same or at least substantially at the same speed as if the vehicle body 110 would not have been disconnected from the conveyor 125 (conveyor 125 is not stopped) under the above mentioned new coordinate reference system defined by the temporary transport assembly 200 resulting in a pseudo-static system.

The moving devices 250 on the robot tracks 220 are then quickly driven back, and when another vehicle body 110 arrives at the assembly station 100, it is lifted from the conveyor 125 and advanced on the moving devices 250 along the robot tracks 220 while the assembly robots 210 perform operations thereon as with the previous vehicle body 110.

When the assembling operations on the vehicle body 110 have been completed, the moving devices 250 are operated to lower the vehicle body 110 to the conveyor 125 at a position corresponding to that as if the vehicle body 110 would not have been disconnected from the conveyor 125. The moving devices 250 or the lifting robots 255 may be then driven back to receive a new vehicle body 110 and the assembly robots 210 may be then positioned to be ready to perform again assembly operations on the next vehicle body 110'.

In both examples described above, the assembly line is not stopped. Both the main transport assembly 120 and the moving devices 250, the lifting robot 255, depending on the example, are operated as if the vehicle body 110 would not have been disconnected from the conveyor 125, and thus the parts carried by them such as the vehicle body 110 and the assembly robots 210.

By the above described vehicle body assembly station 100, the assembly operations, performed by the assembly robots 210 on the vehicle body 110 disconnected from the conveyor 125, are carried out in a more accurate way than when the vehicle body 110 is advanced by the conveyor 125.

Although only a number of particular embodiments and examples of the present vehicle body assembly station have been disclosed herein, it will be understood by those skilled in the art that other alternative examples and/or uses and obvious modifications and equivalents thereof are possible.

For example, other main transport assembly may be used to advance a vehicle along the first direction body such as slat conveyors, conveyor belts, traction chains, skid conveyors, hanging overhead conveyors, lifting chain hangers.

On the other hand, although only one vehicle body has been shown in the drawings for the sake of clarity, the conveyor may convey a number of vehicle bodies, as required.

Furthermore, although the moving device has been described as configured to move along robot tracks and also for temporarily lifting the vehicle body in order to disconnect it from the conveyor, said functions could be performed by different devices. For example, the moving device could be adapted for only moving along the robot tracks, with the vehicle body and/or the carrying platform if present, while a separate device such as a lifting device is provided for temporarily disconnecting the vehicle body from the main transport assembly.

Finally, although the vehicle body may be conveyed through the vehicle manufacturing line following different paths other than linear, for the sake of simplicity, it is assumed that the vehicle body is conveyed following a linear path corresponding to said first direction as shown in the figures of the drawings.

The present disclosure thus covers all possible combinations of the particular examples described. The scope of the present disclosure should not be limited by particular examples, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. A vehicle body assembly station comprising a main transport assembly for conveying a vehicle body along a first direction D1, at least one assembly robot arranged such that at least one part thereof can be moved along a second direction D2, and a temporary transport assembly, on which the assembly robot is arranged, that creates a new coordinate reference system under which the assembly robot performs operations, the operation of said temporary transport assembly being more accurate than that of the main transport assembly, the temporary transport assembly comprising at least one moving device displaceably mounted on corresponding robot tracks for moving the vehicle body along the second direction D2 independently from the main transport assembly while the assembly robot is performing operations on the vehicle body, with said at least one assembly robot being mounted on said corresponding robot tracks to move along said second direction D2 relative to the robot tracks under a new coordinate reference system.

2. The assembly station of claim 1, wherein the main transport assembly comprises an automated guided vehicle adapted for conveying a vehicle body along the first direction D1.

3. The assembly station of claim 1, wherein the temporary transport assembly further comprises a carrying platform fixedly supported by the robot track and suitable for supporting a vehicle body thereon.

4. The assembly station (100) of claim 2, wherein the temporary transport assembly further comprises a carrying platform displaceably supported on the robot track and suitable to displace a vehicle body carried thereon along the second direction D2.

5. The assembly station of claim 4, wherein the carrying platform (300) is supported at two opposite sides thereof by corresponding of said moving devices on robot tracks to be displaced along the second direction D2.

6. The assembly station of claim 4, wherein at least one assembly robot is arranged fixed to the carrying platform.

7. The assembly station of claim 4, wherein at least one ramp is provided for accessing the carrying platform.

8. The assembly station of claim 1, wherein the moving device displaceably mounted on corresponding robot tracks is configured to act as a device for temporarily disconnecting the vehicle body from the main transport assembly.

9. The assembly station of claim 8, wherein the temporary disconnecting device is adapted for lifting a vehicle body relative to the main transport assembly and then moving the vehicle body along the second direction D2 and at the same or at least substantially at the same speed as if the vehicle body would not have been disconnected from the main transport assembly.

10. The assembly station of claim 8, wherein at least one lifting robot is provided configured to act as a device for temporarily disconnecting the vehicle body from the main transport assembly, the lifting robot being adapted for lifting the vehicle body relative to the main transport assembly.

11. The assembly station of claim 1, wherein the assembly robot is arranged such that it can be displaced relative to the robot track.

12. The assembly station of claim 1, wherein said first and second directions D1, D2 are at least substantially parallel to each other.

13. A method for assembling a vehicle body comprising:
conveying the vehicle body by a main transport assembly through at least one assembly station along a first direction D1 in which at least one assembly robot is mounted on corresponding robot tracks to move along a second direction D2 relative to said robot tracks under a new coordinate reference system,
moving the vehicle body, by a temporary transport assembly that comprises at least one moving device displaceably mounted on the corresponding robot tracks whose operation is more accurate than that of the main transport assembly for moving the vehicle body along a second direction D2 independently from the main transport assembly while the assembly robot is performing operations on the vehicle body, said temporary transport assembly creating said new coordinate reference system under which the assembly robot performs operations; and
performing assembling operations on the vehicle body by at least one assembly robot.

14. The method of claim 13, further comprising conveying the vehicle body, once assembly operations on the vehicle body have been completed, again by the main transport assembly.

* * * * *